United States Patent Office 3,579,439
Patented May 18, 1971

3,579,439
TREATMENT OF SEWAGE
Pieter Gerhard Jacobus Meiring and Peter Hendrik Huisman, Pretoria, Transvaal, Republic of South Africa, assignors to South African Inventions Development Corporation
Filed May 27, 1969, Ser. No. 828,116
Int. Cl. C02c 1/10
U.S. Cl. 210—5
9 Claims

ABSTRACT OF THE DISCLOSURE

The invention provides for a process of and an apparatus for the treatment of sewage according to the activated sludge process. In this process and apparatus, raw sewage mixed with activated sludge is agitated in an agitation zone, whereafter a portion of the mixture is directed to a settling zone in which sludge is settled out, and the remainder of the mixture is directed to an aeration.

This invention relates to the treatment of sewage. More particularly, the invention relates to the treatment of sewage according to the activated sludge process.

The applicant is aware of a process for treating sewage according to the activated sludge process in which the full raw sewage flow is subjected to primary sedimentation, the sewage is then aerated in one or more zones, it is thereafter subjected to secondary sedimentation, whereafter some of the sludge precipitated during secondary sedimentation is returned to the aeration zone. Another known process is similar to the process described above except that at least some activated sludge is returned to the influent sewage before primary sedimentation. Yet another process known to the applicant is similar to the process as described above, except that primary sedimentation is omitted. These processes effect a certain degree of denitrification of the sewage effluent.

It is an object of the invention to reduce the biological oxygen demand on the aerobic stabilisation zone without subjecting the full raw sewage flow to primary sedimentation.

It is a further object of the invention to provide a sewage treatment process yielding the same or a higher degree of denitrification than the processes hitherto known to the applicant, but more economically.

According to the invention, a method of sewage treatment according to the activated sludge process includes the steps of subjecting raw sewage and activated sludge to agitation in an agitation zone, directing a portion of the contents from the agitation zone to a settling zone, settling out sludge in the settling zone and withdrawing settled sludge, and directing the remainder of the contents from the agitation zone to an aeration zone.

In this specification it will be understood that "raw sewage" means sewage not subjected to sedimentation and whether or not screened.

Agitation may be effected mechanically, such as by stirrers, or by means of partial aeration, e.g. by means of rotating discs, or by means of stirrers and by aeration.

From the aeration zone a portion of the effluent may be returned to the influent sewage, or the effluent may be subjected to sedimentation. The effluent after sedimentation may be disposed of or may be treated further and he precipitated sludge may be returned to the influent sewage.

At least some of the sludge settled out in the settling zone may be returned to the influent sewage. Alternatively, some or all of the sludge settled out in the settling zone may be subjected to anaerobic digestion.

The process may include still further, the step of controlling the rate of drawing off of liquid from the agitation zone to the settling zone. This control may be effected by controlling the rate of effluent and/or sludge discharge from the settling zone. The effluent from the settling zone may be discharged into the aeration zone. In one arrangement, no controlled effluent discharge takes place from the settling zone, although there may be an interchange of liquid from this zone and the agitation zone. In this arrangement flow from the agitation zone to the settling zone is controlled by controlling the rate of sludge withdrawal from the settling zone.

Further according to the invention, an apparatus suitable for sewage treatment according to the activated sludge process, includes an agitation tank, means to agitate raw sewage and activated sludge in the agitation tank, and regulating means for directing a portion of the contents of the agitation tank to a settling zone and the remainder of the contents to an aeration zone.

Conveniently, the regulating means may include two outlets from the agitation tank. It may further include an underflow connection from the agitation tank to the settling zone, and an overflow connection between the agitation tank and the aeration zone. The connection may be regulatable.

The settling zone may be defined by a settling tank adjacent the agitation tank, the settling tank having an outlet for sludge withdrawal. There may further be provided a connection for returning the settled sludge from the outlet in the settling tank to the agitation tank, and an overflow connection from the settling tank to the aeration zone.

The aeration zone may in one form be defined by a channel adjacent the agitation tank. The agitation tank may likewise be a channel, and the channels may be of a nested configuration.

The invention is described below with reference to the accompanying drawings in which particular embodiments of the invention are illustrated by way of example.

Figure 1:
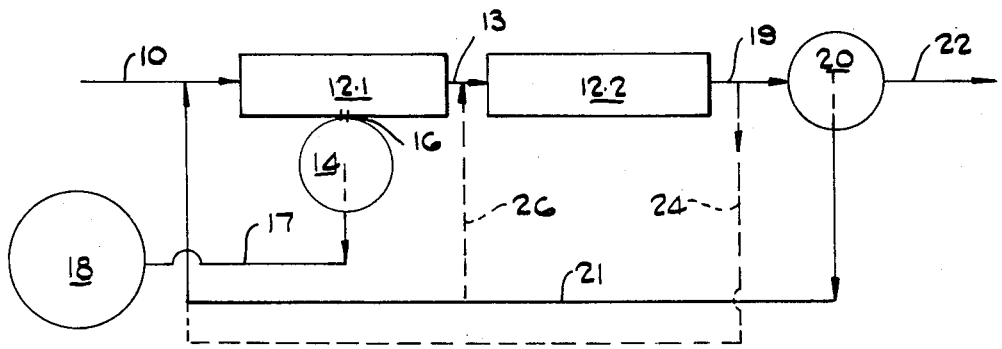
FIG. 1 shows diagrammatically a flow diagram of an activated sludge sewage treatment process in accordance with the invention.

Referring to FIG. 1, there is shown a flow diagram for an activated sludge sewage treatment process for effecting denitrification of the return liquid. Influent screened sewage is fed in at 10 into a complete mixing and agitation tank 12.1 in which the sewage is agitated, and partly aerated. A primary settling tank 14 is provided adjacent the tank 12.1 and is in communication with it through an underflow connection 16.

A portion of the contents of the tank 12.1 is directed to the tank 14 through the connection 16. Flow through the connection may be by gravitational interaction between the tanks. Sludge is allowed to settle out in the tank 14, and the settled sludge is withdrawn from the tank 14 through a connection 17 to an anaerobic sludge digester 18. If tank 14 is directly connected to the tank 12.1, it may constitute a combined settling tank-cum-digester, which may be suitable for smaller plants, and the digester 18 may be omitted. For bigger plants, a separate digester 18 is provided as shown.

Further stages of the process shown in FIG. 1 include an aeration tank 12.2 into which the remainder of the contents of the tank 12.1 is directed through an overflow connection 13. In this tank the sewage is aerated to nitrification. The effluent is led from the tank 12.2 through a connection 19 and is settled in a secondary settling tank 20. Effluent is discharged from the tank 20 at 22, and sludge is returned from this tank to the influent sewage at 10 as shown by the line 21. The process may be varied by returning a portion of the effluent sewage at 10 as shown by the dotted line 24. A further variation may be to return a portion of the sludge from the tank 20 to the aeration tank 12.2 as shown by the dotted line 26.

By desludging some of the contents of the tank 12.1 via the connection 16 and the tank 14, the organic load of flocculated material to be aerated in the aeration tank 12.2 is eased.

Figure 2:
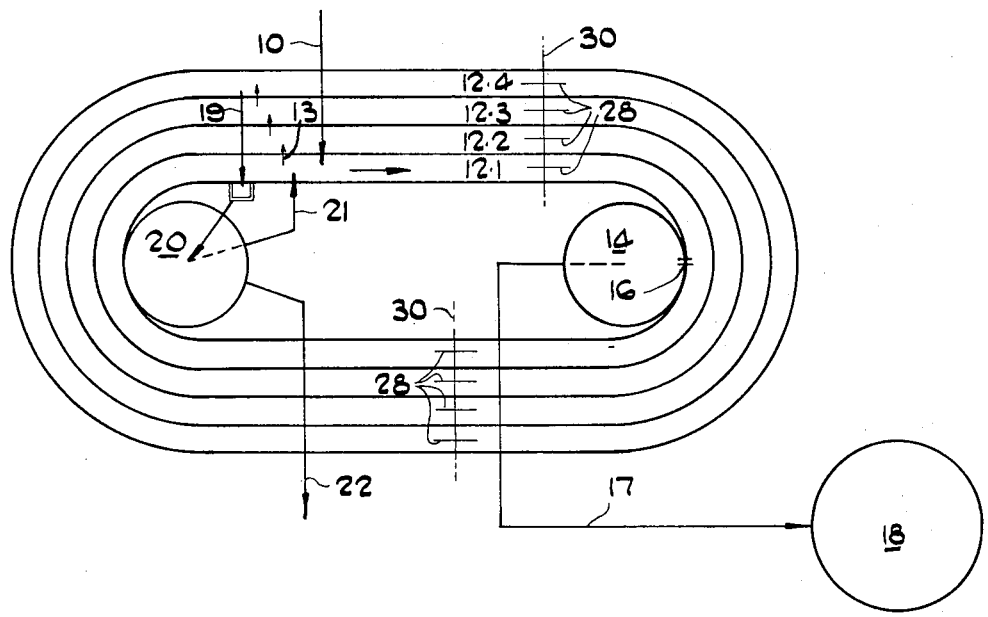
FIG. 2 shows an apparatus for carrying out the process shown in FIG. 1.

Referring now to FIG. 2, there is shown a plant suitable for carrying out the process shown in FIG. 1.

The reference numerals in FIG. 1 indicate items similar to those in FIG. 2. The tanks 12.1 and 12.2 are adjacent, concentric channels of the geometric pattern shown in the drawing. If desired, further channels such as 12.3 and 12.4 may be provided. For example, the agitation tank 12.1 may extend over several channels. Sewage flow may be from the inner channel 12.1 outwardly, as shown, or vice versa.

In the agitation channel 12.1 the screened influent sewage is agitated and partially aerated to effect denitrification of the return liquid fed into the channel 12.2. Agitation in this cahnnel, as well as aeration in the channels 12.2, 12.3, and 12.4 may be effected by means of discs 28 mounted for rotation about horizontal axes 30.

The operation of the plant shown in FIG. 2, is the same as that described with reference to FIG. 1.

Figure 3:
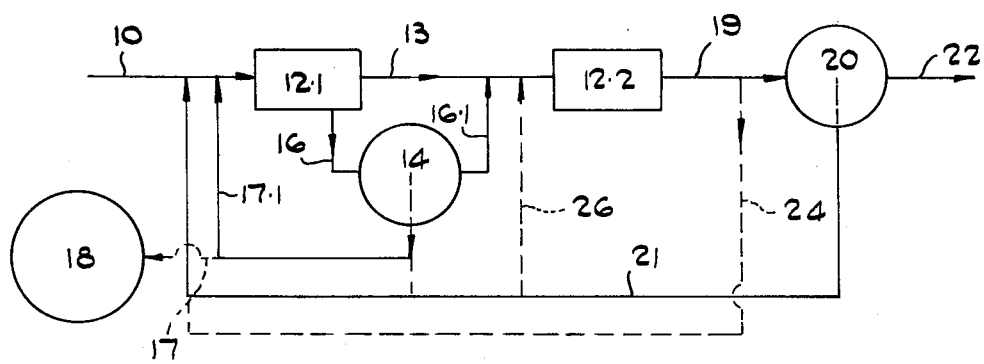
FIG. 3 shows a development of the flow diagram shown in FIG. 1.

Referring to FIG. 3, there is shown a flow diagram similar to that shown in FIG. 1, but two further connections are provided, namely 16.1 and 17.1. The connection 16.1 conducts effluent from the tank 14 through the connection 13 to the aeration tank 12.2. The other connection 17.1 returns settled sludge from the tank 14 to the influent sewage at 10. In this arrangement the connection 16.1 constitutes means to control the draw-off rate of liquid from the agitation tank 12.2, and consequently a positive flow of liquid takes place through the tank 14. By controlling the flow of effluent through the connection 16.1, the draw-off rate of liquid from the tank 12.1 via the conection 16 is controlled. The contents of the tank 12.1 can therefore be apportioned between the connections 13 and 16. Sludge from the tank 14 can be apportioned between the connections 17 and 17.1, i.e. between the digester 18 and the influence sewage at 10, thereby building up a higher concentration of a denitrifying sludge in tank 12.1.

The invention has certain advantages, namely, firstly, that unsettled sewage exerts a biological oxygen demand which accelerates the reduction of nitrates. Secondly, the economic disadvantage of aerobic stabilization of sewage sludge associated with the extended aeration process is largely avoided since a substantial portion of the sludge is stabilized in an anaerobic digester, whereby the organic load of flocculated material on the aeration system is reduced. Thirdly, means is provided to control the nitrogen content of the final effluent.

What is claimed is:

1. A method of sewage treatment according to the activated sludge process including the steps of mixing raw sewage and activated sludge by agitation in an agitation zone, directing a portion of the contents from the agitation zone to a separate settling zone distinct from and horizontally spaced from the agitation zone, settling out sludge in the settling zone and withdrawing settled sludge, and directing the remainder of the contents from the agitation zone to an aeration zone.

2. A method according to claim 1, in which effluent from the settling zone is directed to the aeration zone.

3. A method according to claim 1, in which no controlled effluent discharge takes place from the settling zone and in which the flow rate from the agitation zone to the settling zone is controlled by controlling the rate of sludge withdrawal from the settling zone.

4. A method according to claim 1, in which agitation in the agitation zone is effected by partial aeration of the contents of the agitation zone.

5. An apparatus suitable for sewage treatment according to the activated sludge process, which includes an agitation tank, means to agitate and mix raw sewage and activated sludge in the agitation tank, and regulating means for directing a portion of the contents of the agitation tank to a separate settling zone distinct from and horizontally spaced apart from the agitation zone, and the remainder of the contents to an aeration zone.

6. An apparatus according to claim 5, in which the regulating means includes an underflow connection from the agitation tank to the settling zone.

7. An apparatus according to claim 5, in which the agitating and mixing means includes at least one rotatable disc.

8. An apparatus according to claim 5, in which the settling zone is defined by a settling tank adjacent the agitation tank.

9. An apparatus according to claim 8, in which the settling tank has an overflow connection to the aeration zone.

References Cited

UNITED STATES PATENTS 3,186,939  6/1965  Murray _____ 210—8X

FOREIGN PATENTS 205,597  10/1923  Great Britain _____ 210—8

MICHAEL ROGERS, Primary Examiner

U.S. Cl. X.R.
210—9, 195, 256